United States Patent
Reder et al.

(10) Patent No.: US 6,199,109 B1
(45) Date of Patent: Mar. 6, 2001

(54) TRANSPARENT PROXYING OF EVENT FORWARDING DISCRIMINATORS

(75) Inventors: Paul Joseph Reder, Durham; Mark Clarence Zelek, Cary, both of NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/086,012

(22) Filed: May 28, 1998

(51) Int. Cl.$^7$ .................................................. G06F 15/173
(52) U.S. Cl. ............................................ 709/224; 709/202
(58) Field of Search .................................. 709/223, 224, 709/202

(56) References Cited

U.S. PATENT DOCUMENTS

| | | | |
|---|---|---|---|
| 5,404,532 | * 4/1995 | Allen et al. | 395/700 |
| 5,457,797 | 10/1995 | Butterworth et al. | 395/650 |
| 5,519,863 | 5/1996 | Allen et al. | 395/650 |
| 5,581,552 | 12/1996 | Civanlar et al. | 370/396 |
| 5,613,100 | 3/1997 | Anezaki | 395/500 |
| 5,619,498 | 4/1997 | Sharpe | 370/396 |
| 5,673,265 | 9/1997 | Gupta et al. | 370/432 |
| 5,696,697 | * 12/1997 | Blau et al. | 364/514 |
| 5,896,440 | * 4/1999 | Reed et al. | 379/1 |
| 5,964,837 | * 10/1999 | Chao et al. | 709/224 |
| 5,987,514 | * 11/1999 | Rangarajan | 709/224 |
| 6,006,019 | * 12/1999 | Takei | 395/200.54 |

OTHER PUBLICATIONS

"Compilation of CMISFilter Construct for Verification and Evaluation,"IBM Technical Disclosure Bulletin, V. 37, No. 7, Jul. 1994, pp. 343–345.

"Routing Unsolicited Messages Within a System Utilizing the OSI Management Model,"IBM Technical Disclosure Bulletin, V. 37, No. 04B, Apr. 1994, pp. 25–26.

* cited by examiner

Primary Examiner—Dung C. Dinh
Assistant Examiner—Nkosi Trim
(74) Attorney, Agent, or Firm—Gerald R. Woods; Joseph A. Sawyer, Jr.

(57) ABSTRACT

A method and system for processing an event notification generated by a proxy managed object in a management system, where the management system includes at least one manager and at least one agent. The agent includes a proxy agent coordinator, at least one proxy agent containing one or more event forwarding discriminators, and at least one proxy managed object. The method includes the steps of providing a proxy agent identifier in the notification generated by the proxy managed object, comparing the proxy agent identifier in the notification to an identifier stored in the event forwarding discriminator, and processing the notification if the identifier in the notification matches the identifier stored in the event forwarding discriminator. A set of event forwarding discriminators on one proxy agent can be distinguished from other sets of event forwarding discriminators on other proxy agents via a unique proxy agent identifier for each proxy agent which is stored in the proxy managed object and the event forwarding discriminators, and the unique proxy agent identifier is forwarded in any notification from the proxy managed object to all of the event forwarding discriminators in the system. This method and system is transparent to the manager.

14 Claims, 13 Drawing Sheets

Notification

EFD

Creation of an EFD

Proxy Agent Coordinator Response to a Request for Proxy Agent Identifier

Generation of a Notification

TRANSPARENT PROXYING OF EVENT FORWARDING DISCRIMINATORS

FIELD OF THE INVENTION

The present invention relates to event handling in a network management system, and more specifically to the event notification process.

BACKGROUND OF THE INVENTION

One way that computer networks manage their resources is by using Open Systems Interconnection ("OSI") standards. OSI management uses managed objects to represent resources. FIG. 1 illustrates a conventional system in a computer network operating in an OSI environment. This system 100 includes a "manager" 110 (an application acting in the manager role) and an "agent" 120 (an application acting in the agent role). The agent 120 contains one or more managed objects ($130_1$–$130_t$) ("MO") made visible to the manager 110 via the Common Management Information Protocol ("CMIP"), a discrimination component 140, and Event Forwarding Discriminators ($150_1$–$150_p$) ("EFD") managed by the discrimination component 140. An agent 120 may contain a proxy agent coordinator ("PAC") 160 which provides the appearance of agents, or "proxy agents" ($170_1$–$170_m$) for one or more devices ($180_1$–$180_m$ represented by managed objects ($190_1$–$190_m$) using other existing protocols, such as the Simple Network Management Protocol ("SNMP"). The MOs ($190_1$–$190_m$) made visible by proxy agents ($170_1$–$170_m$) are outwardly indistinguishable from MOs ($130_1$–$130_t$) on a non-proxy agent 120. Rather than interacting directly with a device, MOs ($190_1$–$190_m$) on a proxy agent ($170_1$–$170_m$) interact with a device via the management protocol supported by that device. Typically a manager will work with more than one agent.

All MOs have unique identifiers called Distinguished Names ("DN"). The DN's are organized in a tree-like or hierarchical structure. Each child MO is identified within the scope of its containing parent MO by an attribute of that child MO. An attribute consists of an attribute type and an attribute value. Using a directory mechanism, a manager 110 can determine to which agent a message should be sent to interact with a particular MO.

There are two types of messages that are sent between a manager 110 and an agent 120. The manager 110 can send request messages to MOs ($130_1$–$130_t$) at agent 120 and receive response messages. The manager 110 can also receive unsolicited messages from agent 120. A MO (for example $130_1$) can emit a notification to indicate that some event has occurred concerning the resource represented by the MO $130_1$. To receive this information, the manager 110 must create one or more EFDs ($150_1$–$150_p$) on the agent 120 containing the MO $130_1$.

FIG. 2A illustrates the structure of a conventional notification. A notification contains two groups of information. The first group is the "header" 202 which contains information such as the DN of the MO that emitted the notification and the type of event being described in the notification. The second group 204 is the event information.

FIG. 2B illustrates the structure of a conventional EFD. An EFD is just another type of MO that can reside on an agent. The EFD also contains two groups of information. The first group 206 is the EFD Object Information which includes the DN of the EFD, destination information (a list of managers to which the notifications should be sent), and the state information of the EFD MO. The second group 208 is a filter that determines which notifications should be forwarded. When a notification is forwarded from an agent to a manager, it is sent in a message called an Event Report ("ER").

FIG. 3 is a flow chart illustrating a conventional method of processing a notification emitted by an MO. When a notification is generated, it is sent to the EFDs, via step 302. The discrimination component of the agent sends (or forwards) the notification through each EFD on that agent, via step 304. The values in the filter of the EFD are then compared with the notification event information, via step 306. If the notification passes the criteria specified by the EFD's filter, via step 308, then an ER is sent to each of the managers listed in the EFD's destination information, via step 310.

For example, assume a manager 110 would like to be informed when the status of a resource changes. FIG. 4 illustrates this example. The manager 110 would create an EFD $150_1$ on the agent 120 that contains the MO $130_1$ that represents that resource. This EFD's filter would specify that only status changes should be forwarded, and the destination would be the manager 110 itself. When a status change occurs on the resource, the MO $130_1$ that represents that resource emits a status change notification 410. This notification 410 is presented to each of the EFDs ($150_1$–$150_p$) on the agent 120. Since this notification 410 meets the criteria in the filter of one EFD $150_1$ on this agent 120, an ER 420 is sent to the manager 110. The ER 420 contains the DN of the MO $130_1$ that emitted the notification 410, so that the manager 110 knows which resource had a status change. A manager 110 typically manages more than one agent, so it would create similar EFDs that differ only in the DNs on each of the agents that it manages.

Although the above conventional process is adequate for MOs that interact directly with their associated resources, problems exist when the notification is generated by a proxy MO that is interacting with its resource via some other management protocol. FIG. 4B illustrates this problem. The problem arises because the PAC 160 can support more than one proxy agent ($430_1$–$430_n$). An agent 440 that has a PAC 160 contains sets of EFDs ($450_1$–$450_n$) that would each normally be on different agents. But since a notification must be sent to all of the EFDs ($450_1$–$450_n$) on an agent 120, and since all of the EFDs that are created by the manager 110 on proxy agents ($430_1$–$430_n$) are nearly identical, a notification emitted by a proxy MO, such as 460, on a proxy agent $430_1$ will be processed and forwarded not only by the set of EFD $450_1$ on proxy agent $430_1$, but also by all other sets of EFDs ($450_2$–$450_n$) on other proxy agents ($430_1$–$430_n$). The result is redundant processing, since each EFD on the proxy agents (160-1 through 160-r) must perform the same evaluation on the notification and the results will be the same, causing extra network traffic. Thus many ERs will be sent rather than just one which could possibly cause confusion for the managers, especially if the notification indicates that a resource has been created.

The ISO-Internet Migration/Coexistence (IIMC) group has developed one approach to the above problem by requiring that EFDs on a proxy agent be contained under a special managed object on that proxy agent. The discrimination component is enhanced so that notifications emitted by an MO on a proxy agent are sent only to the EFDs contained under the special managed object. Although this avoids the problem above, it introduces a new problem. This approach requires that the managers create their EFD's under the correct special managed object, i.e., the managers must know ahead of time which devices are supported by proxy agents and which are supported by non-proxy agents and handle the creation of the EFDs accordingly. This defeats the purpose of the proxy which is to hide differences from managers. This approach requires the existing manager applications to be at least partially rewritten and complicates the development of new managers. Thus, this approach is inflexible and cumbersome in its implementation.

Therefore, there exists a need for an event notification method and system which has the ability to distinguish between sets of EFDs on different proxy agents while maintaining the ability to hide the difference between proxy agents and non-proxy agents from managers. This system should be easy to implement and should not require changes to the programming of existing managers nor require new managers to be sensitive to the differences between proxy agents and non-proxy agents. The present invention addresses such a need.

SUMMARY OF THE INVENTION

The present invention provides a method and system for processing an event notification generated by a proxy managed object in a management system, where the management system includes at least one manager and at least one agent. The agent includes a proxy agent coordinator, at least one proxy agent containing one or more event forwarding discriminators, and at least one proxy managed object. The present invention includes the steps of providing a proxy agent identifier in the notification generated by the proxy managed object, comparing the proxy agent identifier in the notification to an identifier stored in the event forwarding discriminator, and processing the notification if the proxy agent identifier in the notification matches the identifier stored in the event forwarding discriminator. The present invention allows for the distinguishing of a set of event forwarding discriminators on one proxy agent from other sets of event forwarding discriminators on other proxy agents via a proxy agent identifier for each proxy agent which is stored in the proxy managed object and the event forwarding discriminators, and the unique proxy agent identifier is forwarded in any notification from the proxy managed object to all of the event forwarding discriminators in the system. This method and system is transparent to the manager, and thus is easily implemented and compatible with existing managers.

DETAILED DESCRIPTION OF THE INVENTION

The present invention relates to an improvement in a method and system of event notification. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention improves the event notification process by providing a method and system for uniquely identifying a set of EFDs to which a notification emitted by a proxy MO should be sent.

To more particularly describe the features of an event notification process in accordance with the present invention in the context of a preferred embodiment, please refer to FIGS. 5 through 11 and the following discussion.

Figure 1:
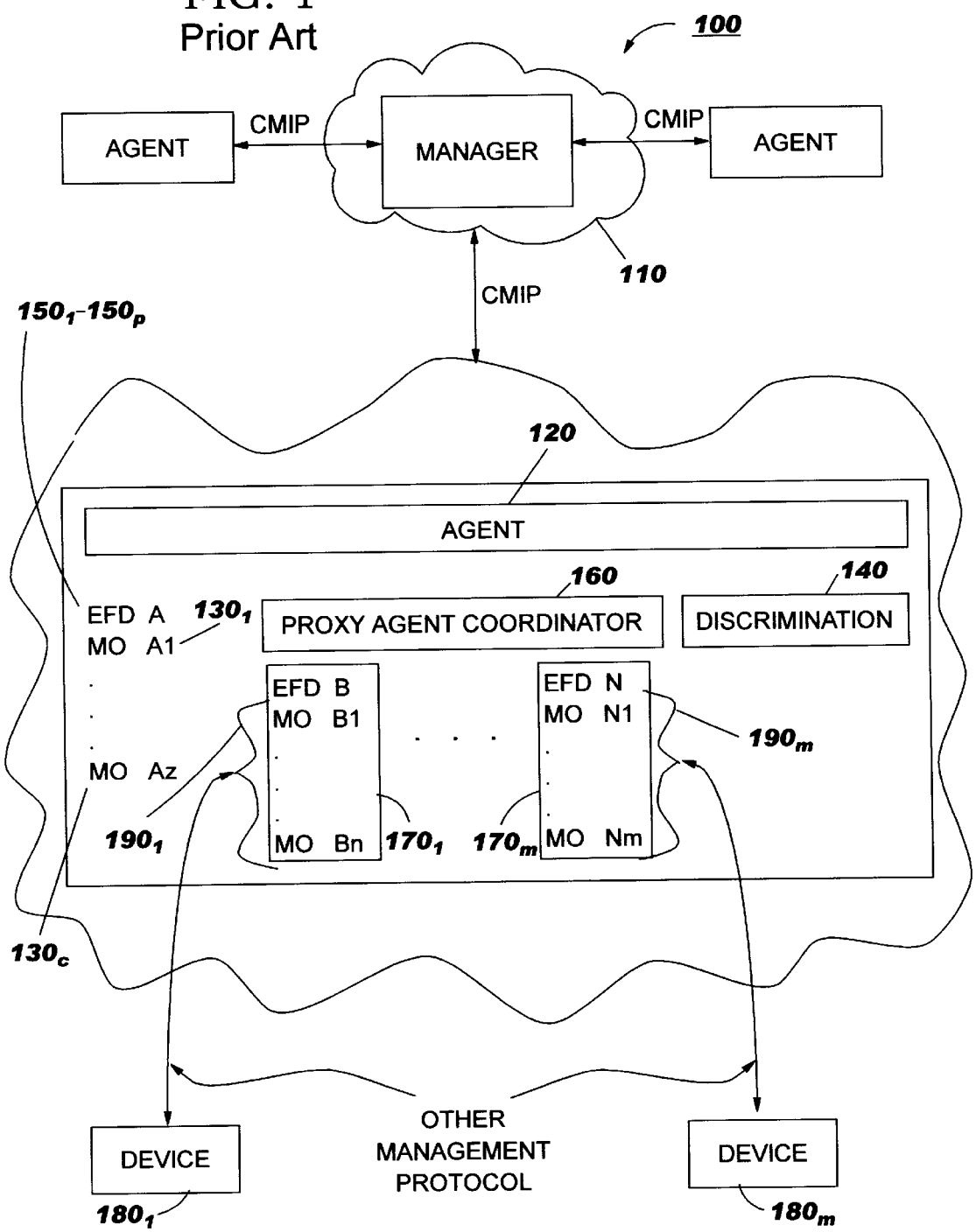
FIG. 1 is a block diagram of a conventional system in a computer network operating in a standard OSI network management environment.
Figure 2A:
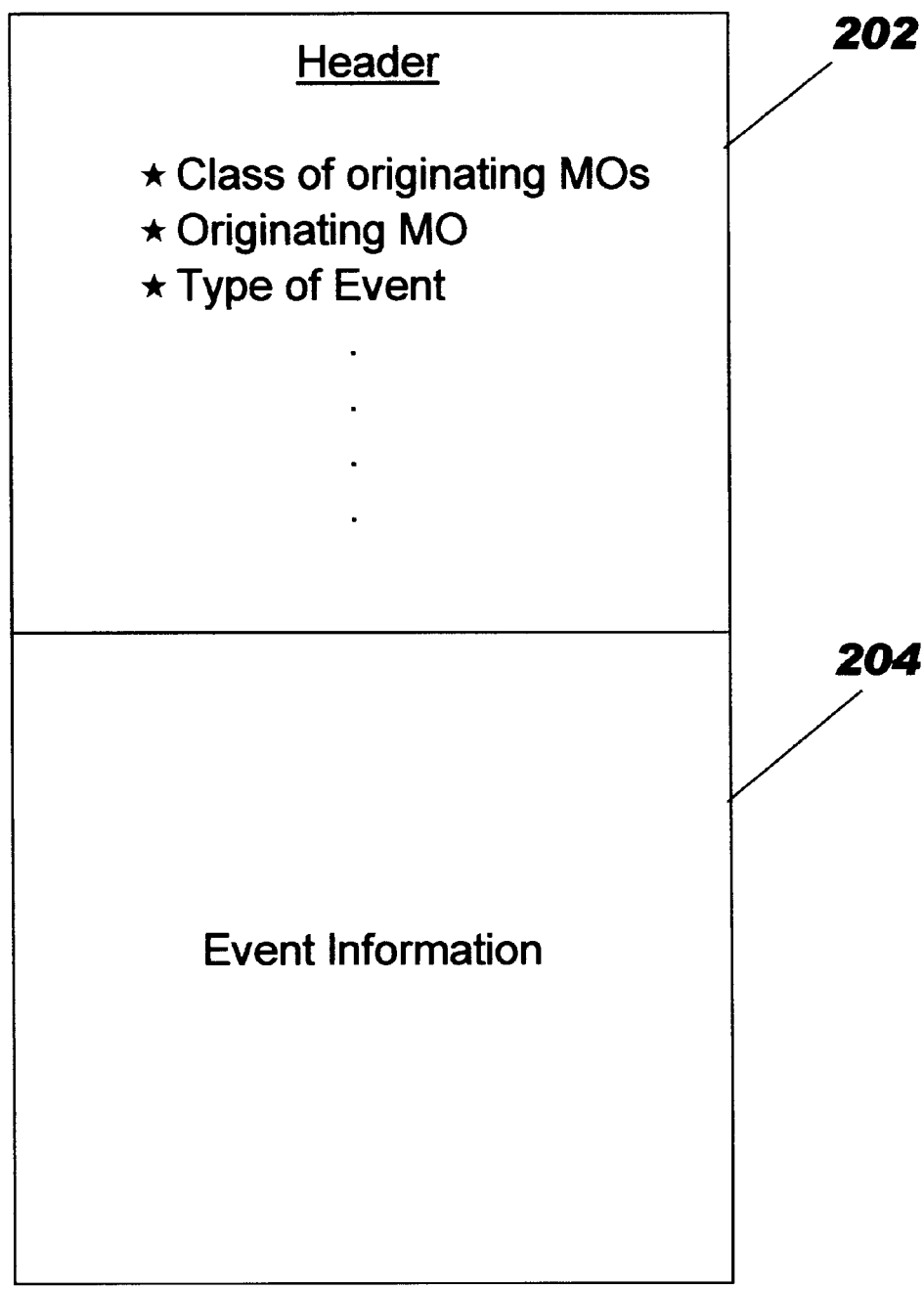
FIGS. 2A and 2B is an illustration of the structures of a conventional notification and a conventional EFD.
Figure 2B:
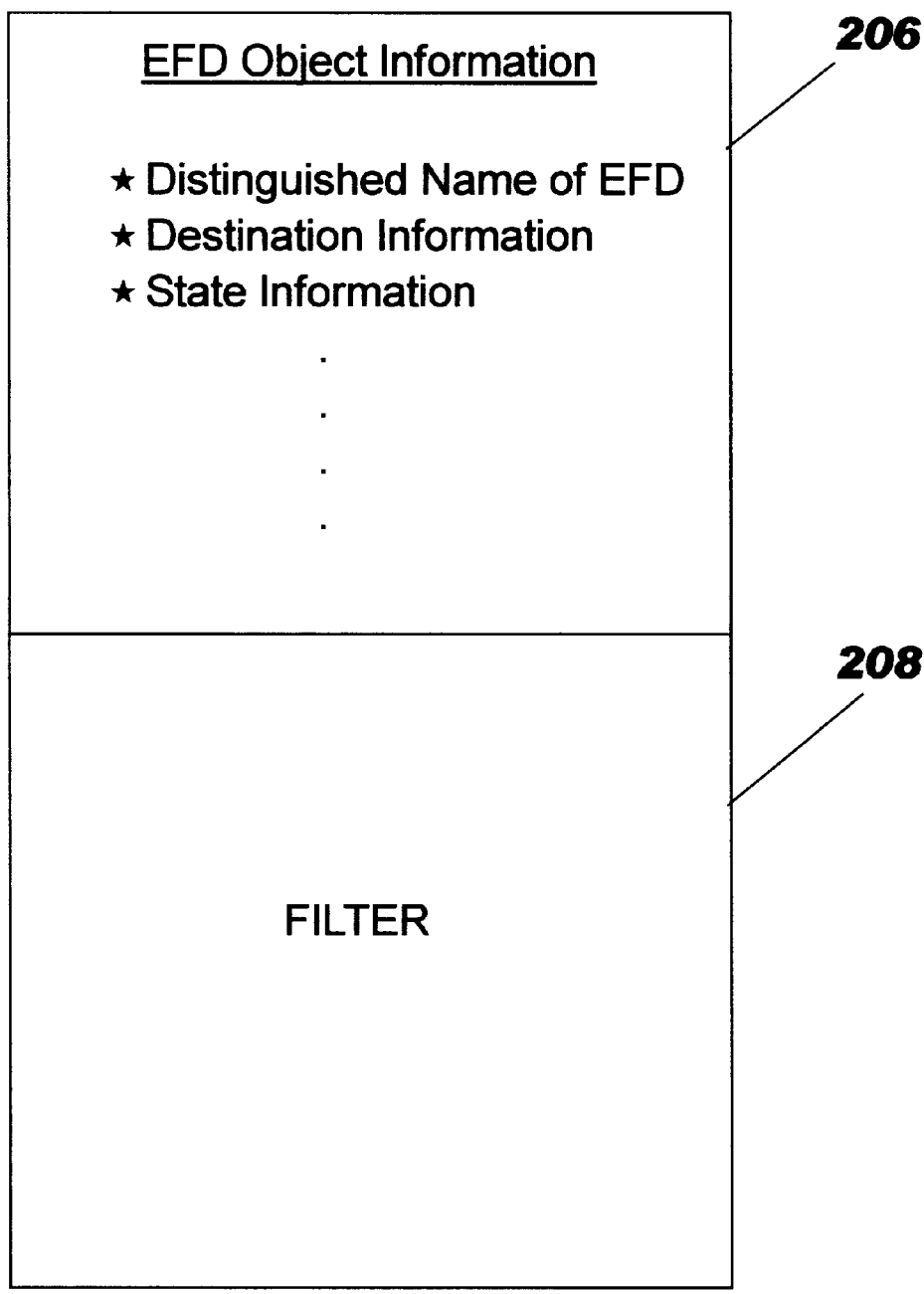
Figure 3:
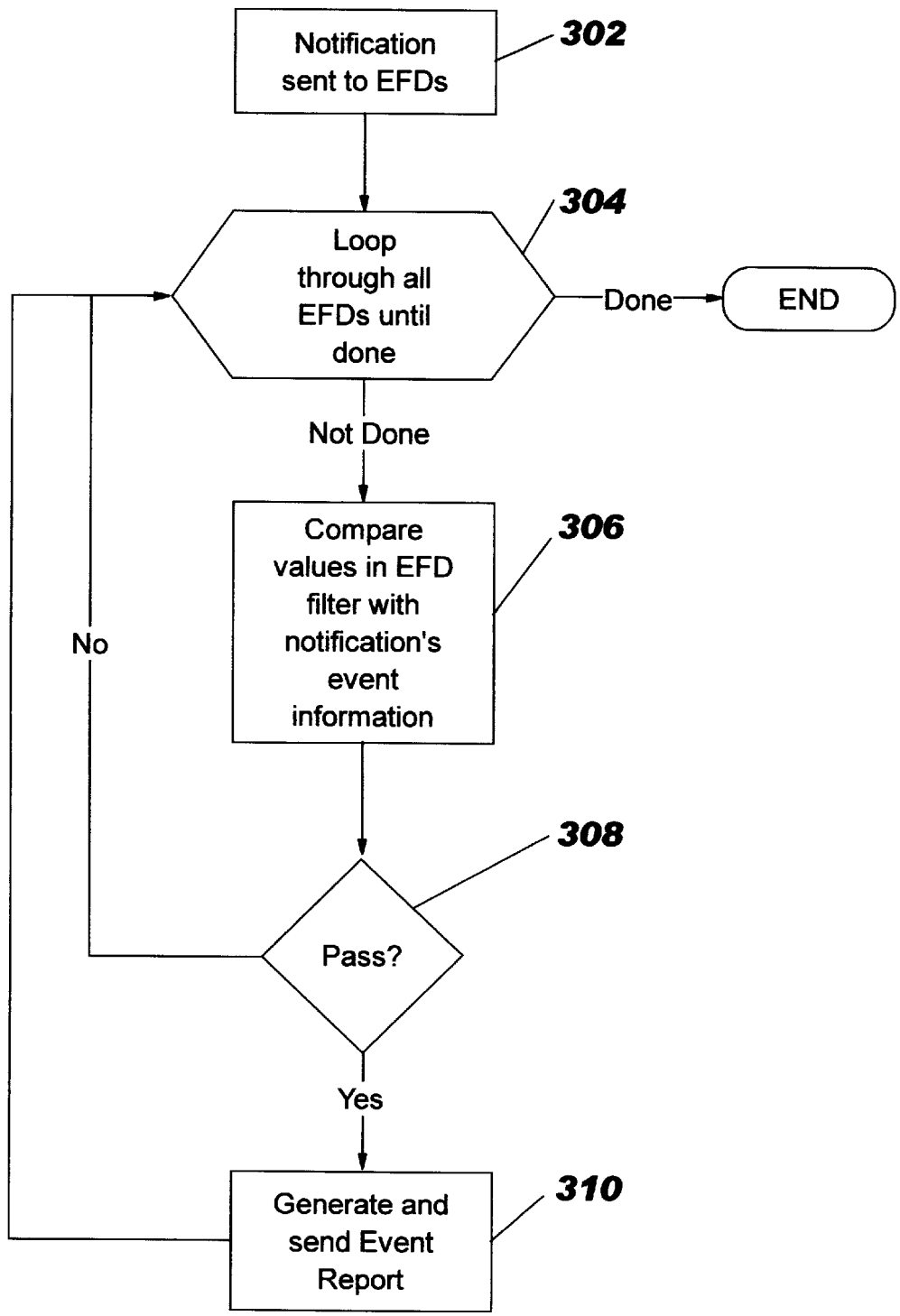
FIG. 3 is a flow chart illustrating the processing of a notification under a conventional method.
Figure 4A:
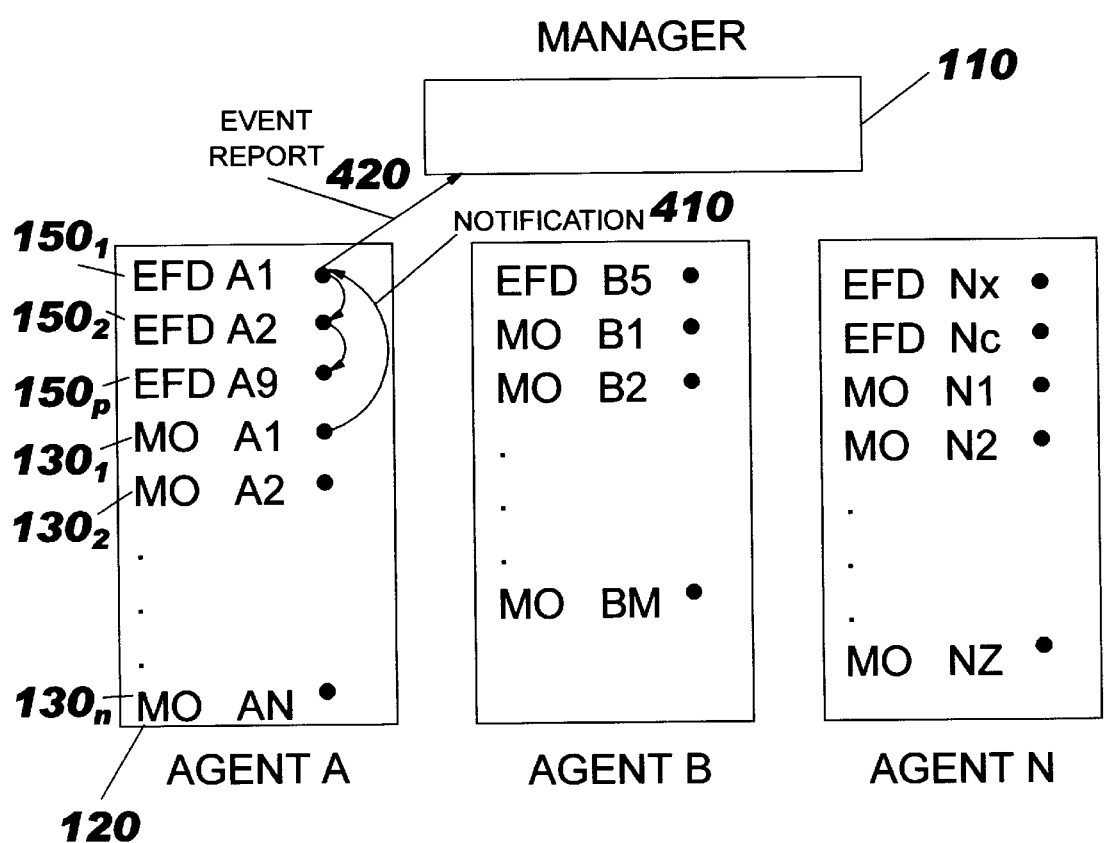
FIGS. 4A and 4B illustrate an example of the processing of a notification under a conventional method.
Figure 4B:
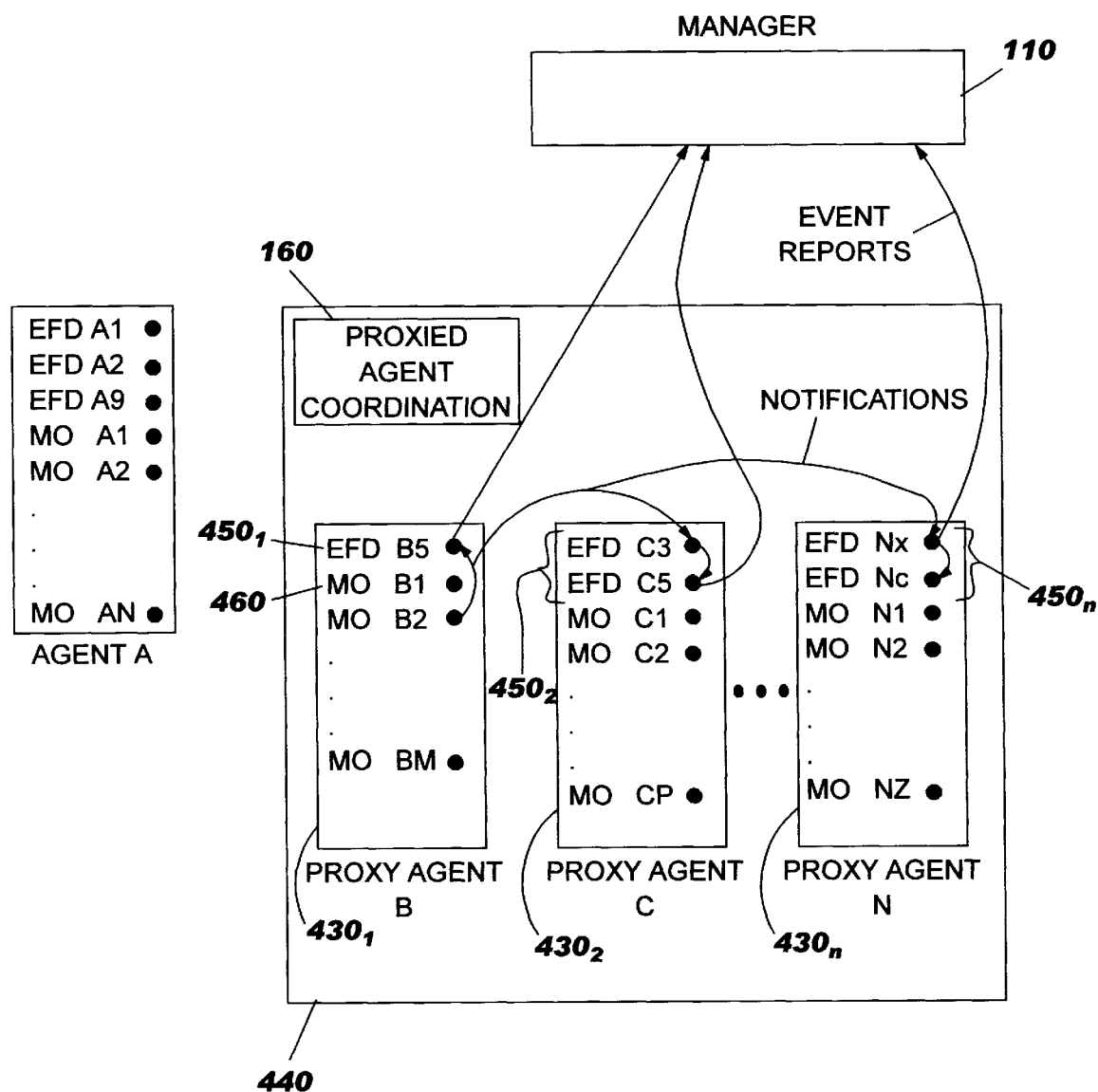
Figure 5:
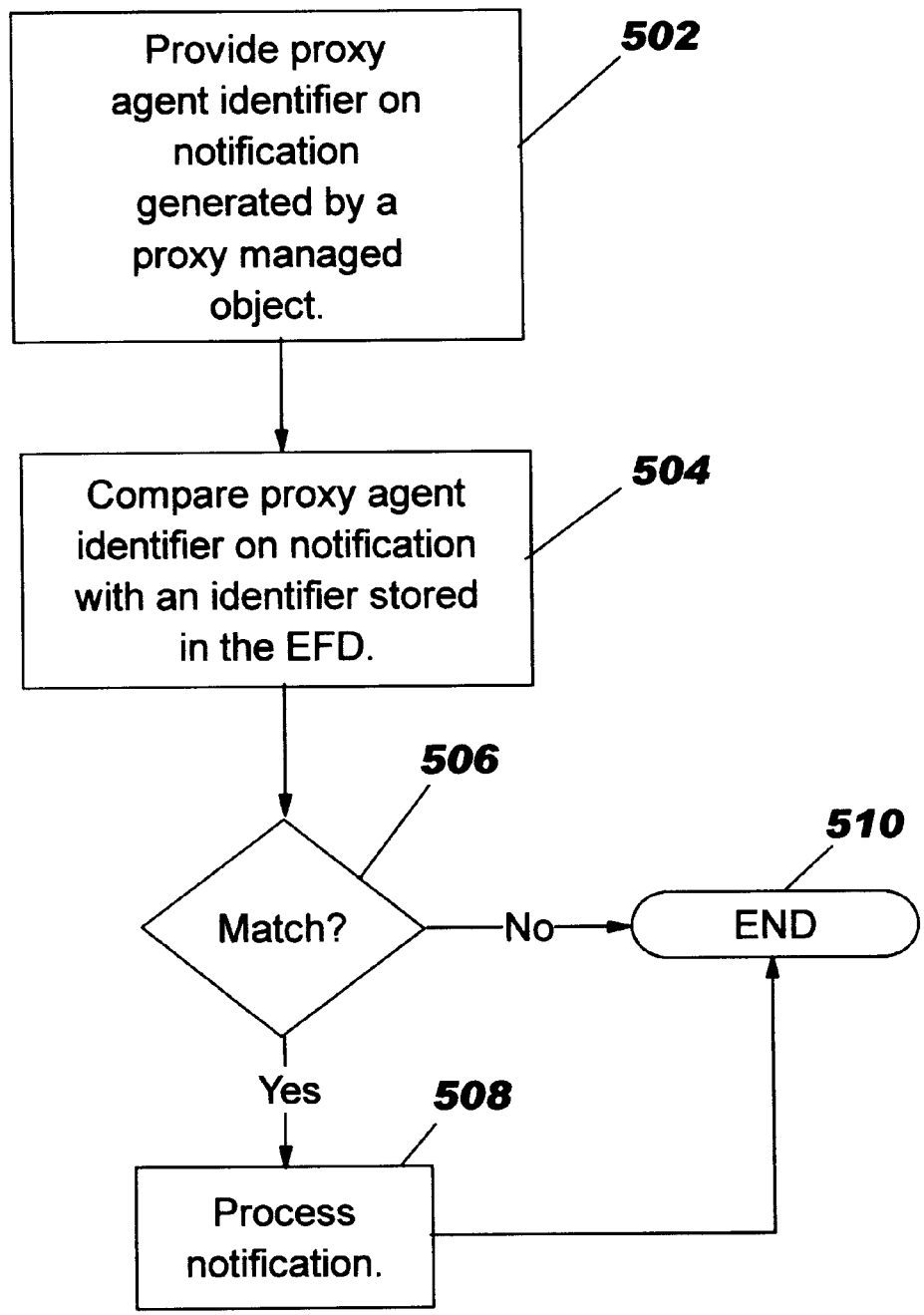
FIG. 5 is a flow chart illustrating the processing of a notification in accordance with the present invention.

FIG. 5 is a flow chart illustrating the event notification process in accordance with the present invention. First, a proxy agent identifier that uniquely identifies the proxy agent containing the proxy MO that emitted this notification is provided in a notification generated by the proxy MO, via step 502. Next, this proxy agent identifier in the notification is compared with an identifier stored on the EFD that uniquely identifies the proxy agent containing the EFD, via step 504. If there is a match, via step 506, the EFD will continue processing the notification, via step 508. If not, the processing ends, via step 510.

Although the proxy agent identifier can be any unique value, in a preferred embodiment of the present invention, the proxy agent identifier would be the network address of the legacy device managed by the proxy agent.

Figure 6:
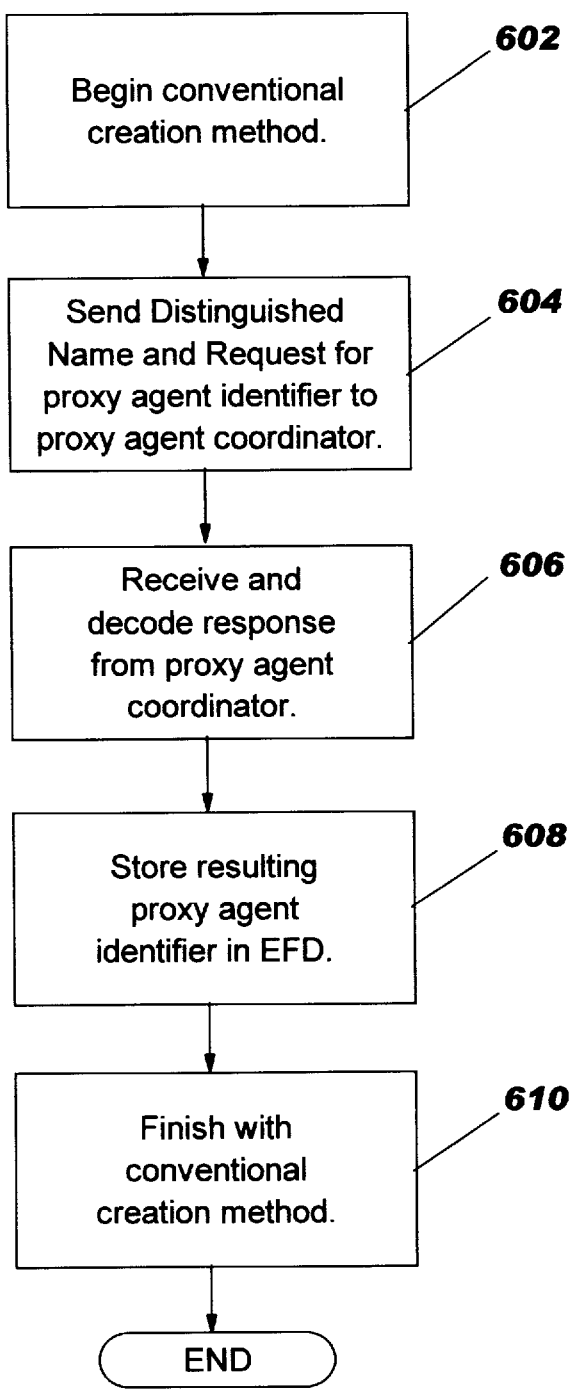
FIG. 6 is a flow chart illustrating the creation of an event forwarding discriminator in accordance with the present invention.
Figure 7:
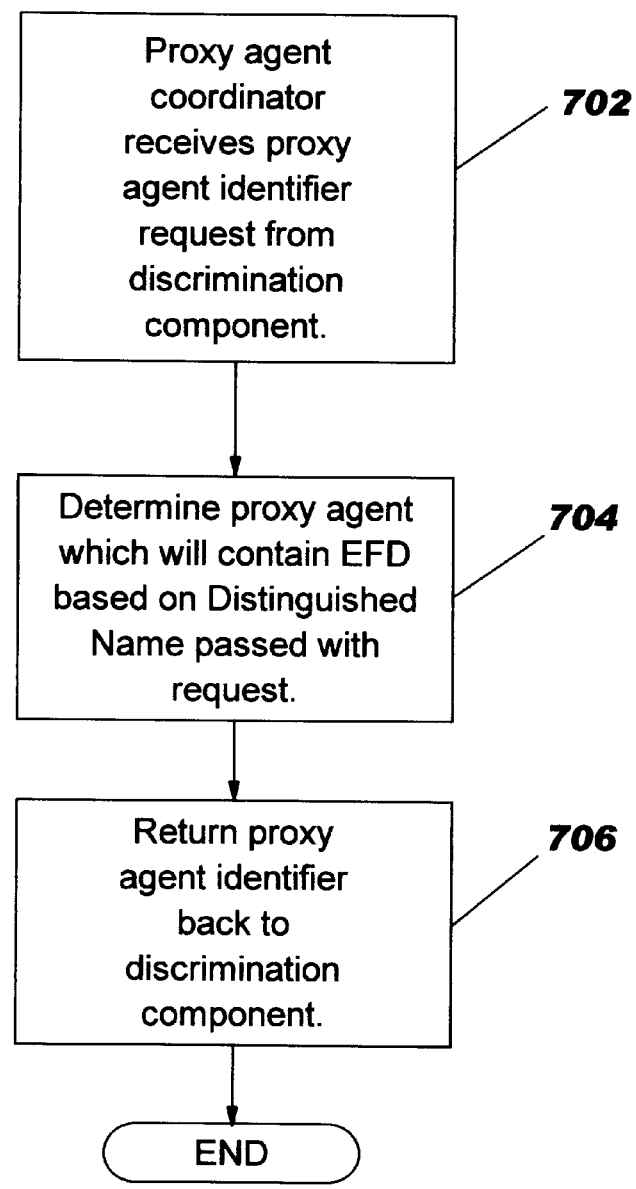
FIG. 7 is a flow chart illustrating the receipt of a proxy agent identifier request by a proxy agent coordinator from an event forwarding discriminator in accordance with the present invention.
Figure 8:
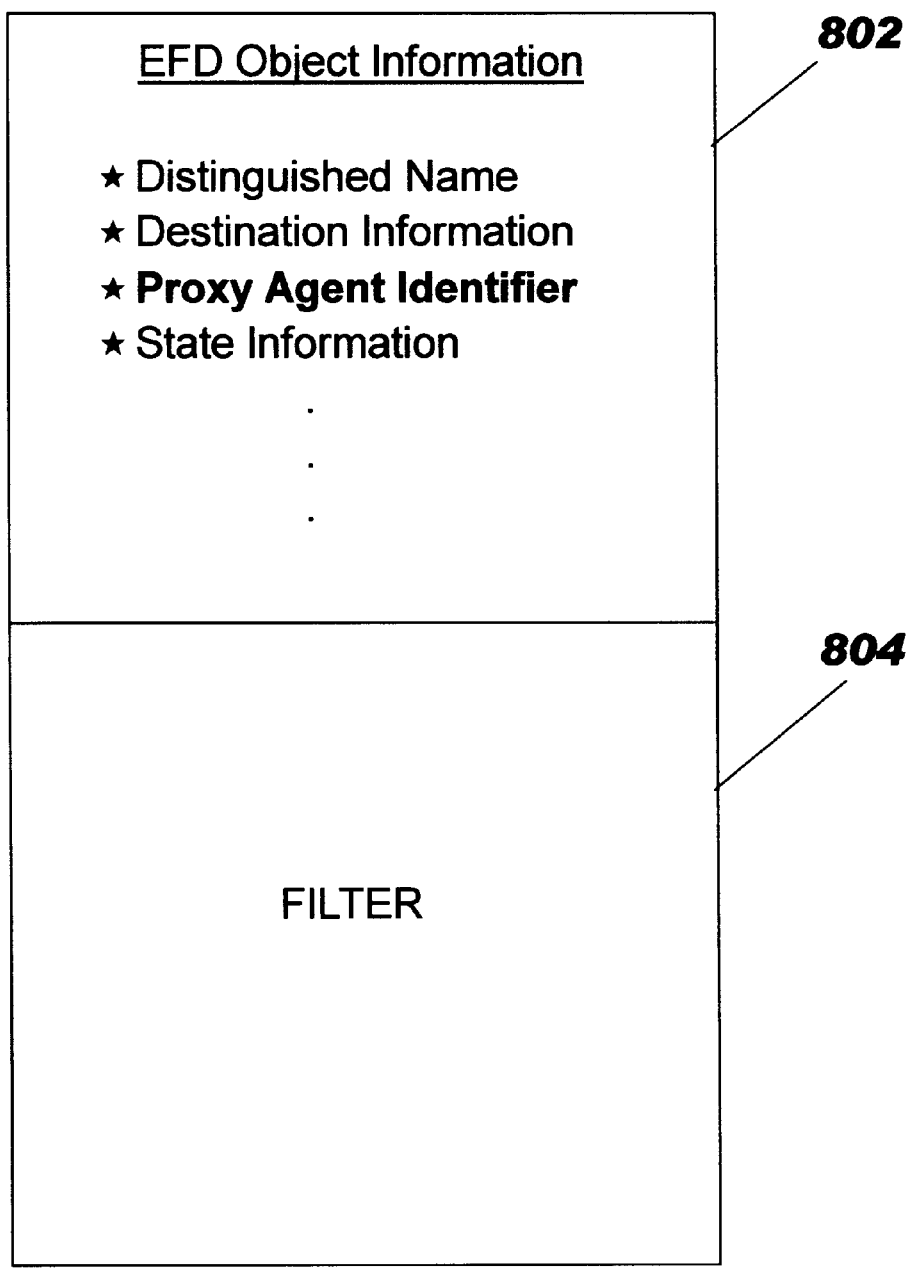
FIG. 8 is an illustration of the structure of an EFD created in accordance with the present invention.

Before the identifiers can be compared, the proxy agent identifier must be added to notifications emitted by proxy MOs and the associated proxy agent identifier must be stored in the EFD when it is created. FIG. 6 through 8 illustrate the creation of notifications and EFDs in accordance with the present invention.

FIG. 6 is a flow chart illustrating a preferred embodiment of the creation of an EFD with an identifier that uniquely identifies the proxy agent containing that EFD in accordance with the present invention. The creation begins with the conventional methods under OSI standards, via step 602. The conventional creation method for EFDs is well known in the art and will not be further discussed here. The discrimination component of the agent passes the DN of the EFD being created to the PAC and requests a unique proxy agent identifier that uniquely identifies the proxy agent containing the EFD, via step 604. The PAC's response to this request is received and decoded to obtain the proxy agent identifier, via step 606. The proxy agent identifier is then stored in the EFD, via step 608. The creation of the EFD is then completed according to the conventional methods, via step 610.

FIG. 7 is a flow chart illustrating the steps the PAC takes in response to a request from the discrimination component of the agent for a proxy agent identifier, in accordance with the present invention. When the PAC receives the request, via step 702, it analyses the DN of the EFD passed with the request and determines which proxy agent will contain the EFD with that DN, via step 704. The PAC then returns the corresponding unique identifier for that proxy agent to the discrimination component, via step 706.

FIG. 8 illustrates the structure of an EFD created in accordance with the present invention. In the EFD's first group of information 802, it includes an additional proxy agent identifier stored in its EFD Object Information. The EFD's second group of information 804 still contains a filter that determines whether the notification should be forwarded.

Figure 9:
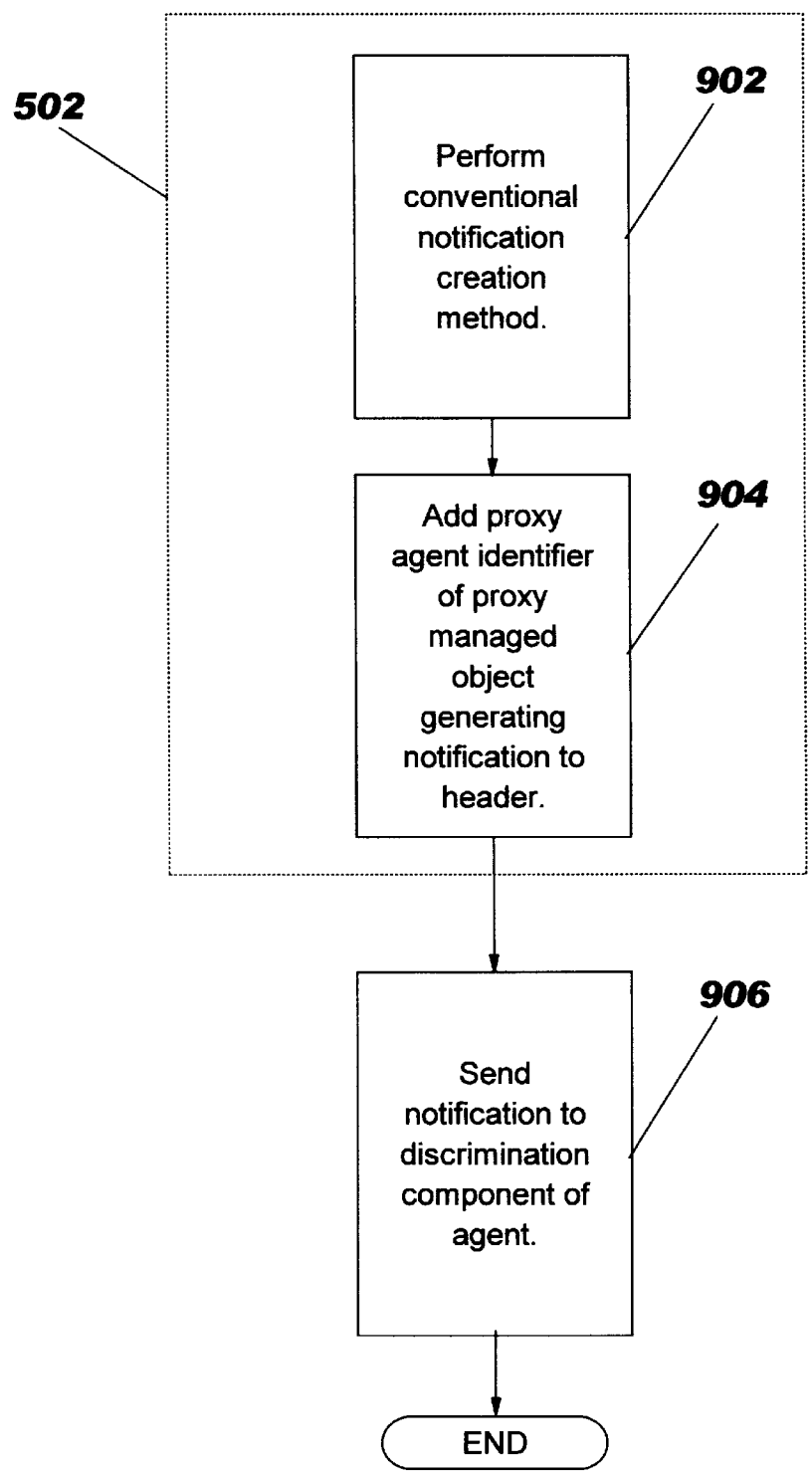
FIG. 9 is a flow chart illustrating the generation of a notification in accordance with the present invention.

FIG. 9 is a flow chart illustrating the generation of a notification by a proxy MO in accordance with the present invention. (This flow chart illustrates in more detail step 502 of FIG. 5.) The generation begins with the conventional methods under OSI standards, via step 902. The conventional method for generating a notification is well known in the art and will not be further discussed here. The method according to the present invention adds the proxy agent identifier of the proxy managed object generating the notification to the notification's header, via step 904. Then, the notification is sent to the discrimination component of the agent for processing, via step 906.

Figure 10:
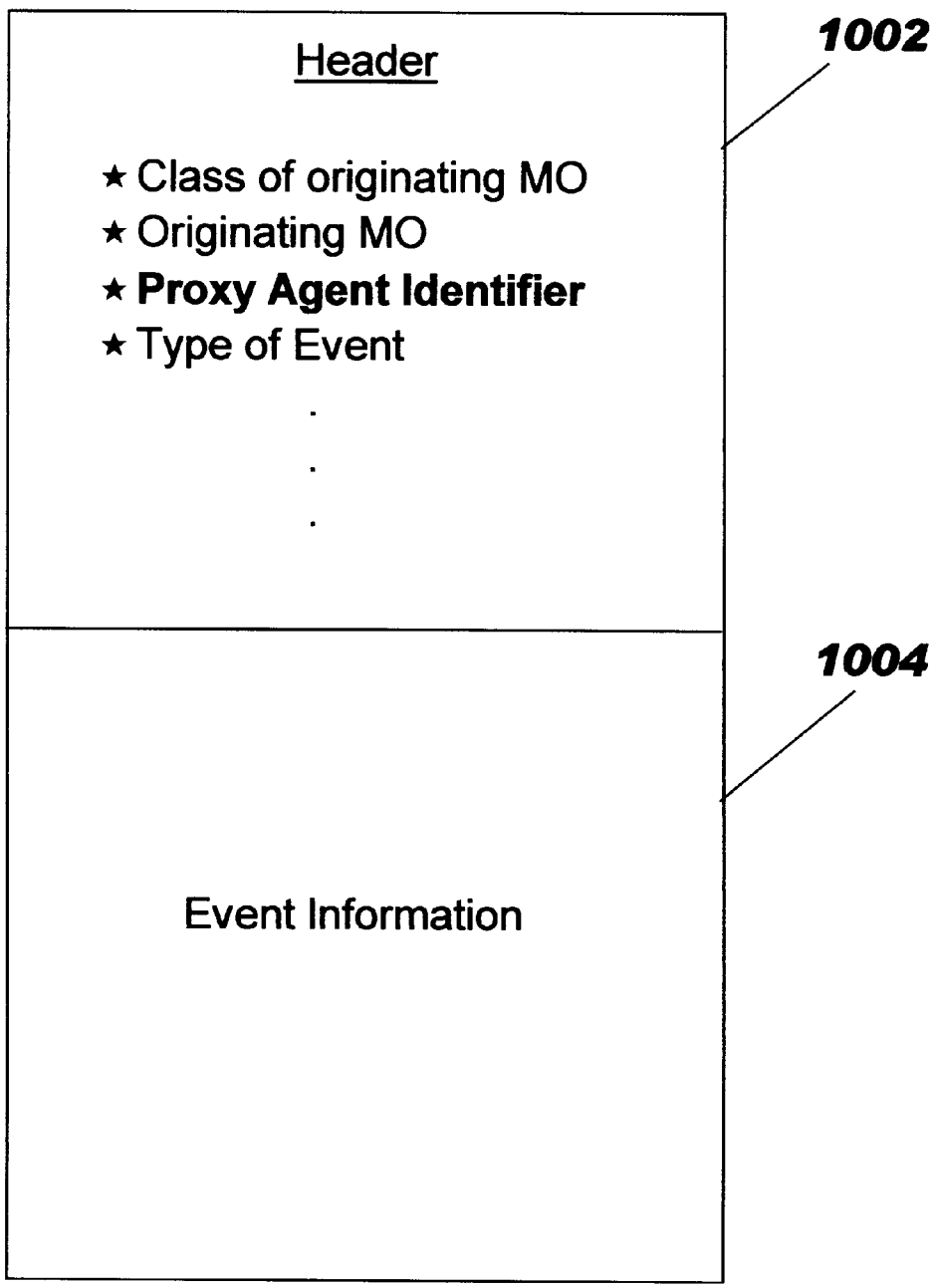
FIG. 10 is an illustration of the structure of a notification created in accordance with the present invention.

FIG. 10 illustrates the structure of a notification created in accordance with the present invention. The notification's header 1002 contains the additional proxy agent identifier that uniquely identifies the proxy agent containing the proxy MO that emitted the notification. The notification's second group of information 1004 still contains the event information.

Once the proxy agent identifier values are added to notifications and stored in EFDs, the identifiers are ready to be used in the event notification process of the present invention, as described in FIG. 11 and the discussion below.

Figure 11:
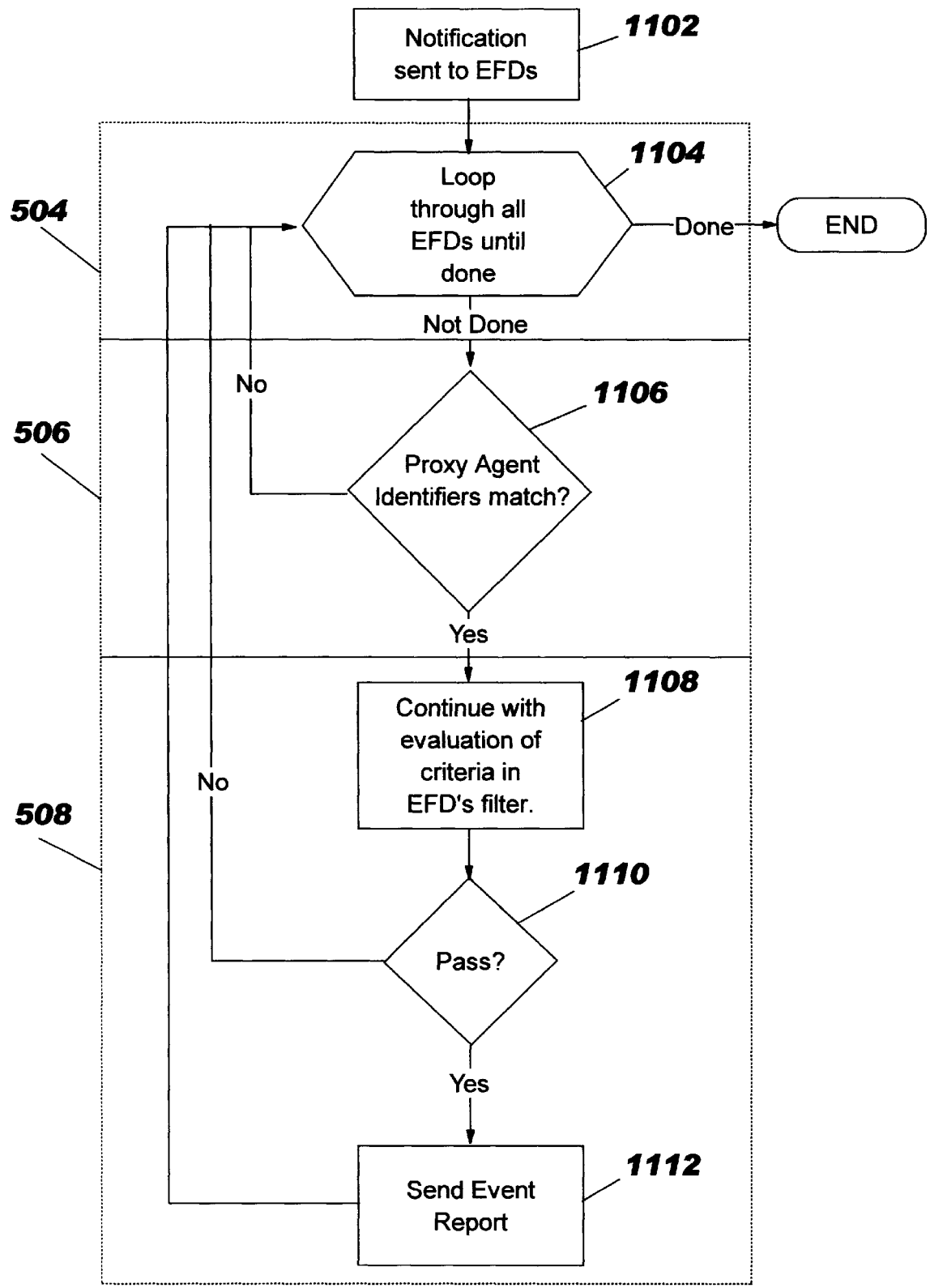
FIG. 11 is a flow chart illustrating the processing of a notification by an event forwarding discriminator in accordance with the present invention.

FIG. 11 is a flow chart illustrating the processing of the notification once it is received by the discrimination component of the agent in accordance with the present invention. When a notification is sent to the EFDs by the discrimination component, via step 1102, it is looped through each EFD until all of them have processed the notification, via step 1104. (Step 1104 illustrates in more detail step 504 of FIG. 5.) With each EFD, the proxy agent identifier in the notification is compared with the identifier stored in the EFD during creation, via step 1106. This step is not done under the conventional method of notification processing and is equivalent to step 506 of FIG. 5. If there is no match, the processing with this EFD ends, and the notification is sent to the next EFD. If there is a match, then the processing continues with the evaluation of the criteria in the EFD's filter as done under the conventional processing method, via step 1108. If the notification passes the filter, via step 1110, then an ER is sent to the managers listed in the destination information in the EFD, via step 1112. (steps 1108 through 1112 illustrate in more detail step 508 of FIG. 5.) If the notification does not pass the filter, then the processing by this EFD ends here, and the notification is sent to the next EFD. This continues until the notification has been processed by all EFDs on the agent.

As can be seen by the flow charts in FIGS. 5 through 7, 9, and 11, the manager is not involved at all in the assignment or processing of the proxy agent identifier values. Only the PAC and the EFDs are directly involved. The processing of the proxy agent identifier values is transparent to managers. Thus, the event notification method in accordance with the present invention does not require the manager to know if it is dealing with proxy agents or non-proxy agents. The advantage of this is that the manager need not be reprogrammed or rewritten to be sensitive to whether it is interacting with a proxy agent or a non-proxy agent. This method is thus compatible with existing managers.

An improved method and system for event notifications has been disclosed. The method and system of the present invention allows one set of EFDs on a proxy agent to be distinguishable from other sets of EFDs on other proxy agents. This allows notifications emitted by a proxy MO to be processed by the EFDs on the proxy agent containing that proxy MO without unnecessary processing by other proxy agents. This method and system is transparent to managers, and thus is easily implemented and compatible with existing managers.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for processing an event notification generated by a proxy managed object in a management system, the management system including at least one manager and at least one agent, the agent including a proxy agent coordinator, at least one proxy agent containing one or more event forwarding discriminators, and at least one proxy managed object; the method comprising the steps of:

(a) providing a proxy agent identifier in the notification generated by the proxy managed object;

(b) comparing the proxy agent identifier in the notification to an identifier stored in the event forwarding discriminator; and (c) processing the notification if the proxy agent identifier in the notification matches the identifier stored in the event forwarding discriminator.

2. The method of claim 1, wherein the proxy agent identifier in the notification uniquely identifies the proxy agent containing the proxy managed object instance from which the notification originated.

3. The method of claim 1, wherein the identifier stored in the event forwarding discriminator corresponds to the proxy agent containing the event forwarding discriminator.

4. The method of claim 1, wherein the processing step (c) comprises the steps of:

(c1) continuing with an evaluation of criteria in a filter of the event forwarding discriminator; and (c2) generating and sending an Event Report by the event forwarding discriminator if the notification passes the evaluation of step (c1).

5. A system for processing an event notification generated by a proxy managed object in a management system, the management system including at least one manager and at least one agent, the agent including a proxy agent coordinator, at least one proxy agent containing one or more event forwarding discriminators, and at least one proxy managed object; the system comprising:

means for providing a proxy agent identifier in the notification generated by the proxy managed object;

means for comparing the proxy agent identifier to an identifier stored in the event forwarding discriminator; and means for processing the notification if the proxy agent identifier in the notification matches the identifier stored in the event forwarding discriminator.

6. The system of claim 5, wherein the proxy agent identifier identifies the proxy agent containing the proxy managed object from which the notification originated.

7. The system of claim 5, wherein the identifier stored in the event forwarding discriminator corresponds to the proxy agent containing the event forwarding discriminator.

8. The system of claim 5, wherein the processing means comprises:

means for continuing with an evaluation of criteria in a filter of the event forwarding discriminator; and means for generating and sending an Event Report by the event forwarding discriminator if the notification passes the evaluation.

9. A system for processing an event notification generated by a proxy managed object in a management system, the management system including at least one manager and at least one agent, the agent including a proxy agent coordinator, at least one proxy agent containing one or more event forwarding discriminators, and at least one proxy managed object; the system comprising:

means for providing a proxy agent identifier in the notification generated by the proxy managed object, wherein the proxy agent identifier uniquely identifies a proxy agent containing the proxy managed object from which an event occurred;

means for comparing the proxy agent identifier in the notification to an identifier stored in the event forwarding discriminator, wherein the identifier stored in the event forwarding discriminator uniquely identifies the proxy agent that contains the event forwarding discriminator; and means for processing the notification if the proxy agent identifier in the notification matches the identifier stored in the event forwarding discriminator.

10. The system of claim 9, wherein the processing means comprises:

means for continuing with an evaluation of criteria in a filter of the event forwarding discriminator; and means for generating and sending an Event Report by the event forwarding discriminator if the notification passes the evaluation.

11. A computer readable medium with computer instructions for processing an event notification generated by a proxy managed object in a management system, the management system including at least one manager and at least one agent, the agent including a proxy agent coordinator, at least one proxy agent containing one or more event forwarding discriminators, and at least one proxy managed object; the computer instructions for:

(a) providing a proxy agent identifier in the notification generated by a proxy managed object;

(b) comparing the proxy agent identifier in the notification to an identifier stored in the event forwarding discriminator; and (c) processing the notification if the proxy agent identifier in the notification matches the identifier stored in the event forwarding discriminator.

12. A method for processing an event notification generated by a proxy managed object in a management system, the management system including at least one manager and at least one agent, the agent including a proxy agent coordinator, at least one proxy agent containing one or more event forwarding discriminators including an identifier created by sending a request from the event forwarding discriminator to the proxy agent coordinator to obtain the identifier based upon the distinguished name of the event forwarding discriminator, returning the identifier to the event forwarding discriminator and storing the identifier in the requesting event forwarding discriminator, and at least one proxy managed object, the method comprising the steps of:

(a) providing a proxy agent identifier in the notification generated by the proxy managed object, said proxy agent identifier uniquely identifying the proxy agent containing the proxy managed object instance from which the notification originated;

(b) comparing the proxy agent identifier in the notification to an identifier stored in the event forwarding discriminator, said stored identifier corresponding to the proxy agent containing the proxy managed object instance from which the notification originated; and (c) processing the notification if the proxy agent identifier in the notification matches the identifier stored in the event forwarding discriminator.

13. A system for processing an event notification generated by a proxy managed object in a management system, the management system including at least one manager and at least one agent, the agent including a proxy agent coordinator, at least one proxy agent containing one or more event forwarding discriminators containing an identifier created during the creation of the event forwarding discriminator by means for sending a request from the event forwarding discriminator to the proxy agent coordinator to obtain the identifier based upon the distinguished name of the event forwarding discriminator, means for returning the identifier from the proxy agent coordinator to the event forwarding discriminator, and means for storing the returned identifier in the event forwarding discriminator, said system comprising:

means for providing a proxy agent identifier in the notification generated by the proxy managed object, the proxy agent identifier identifying the proxy agent containing the proxy managed object from which the notification originated;

means for comparing the proxy agent identifier in the notification to the identifier stored in the event stored in the event forwarding discriminator, said stored identifier corresponding to the proxy agent containing the event forwarding discriminator; and means for processing the notification if the proxy agent identifier in the notification matches the identifier stored in the event forwarding discriminator.

14. A system for processing an event notification generated by a proxy managed object in a management system, the management system including at least one manager and at least one agent, the agent including a proxy agent coordinator, at least one proxy agent containing one or more event forwarding discriminators containing an identifier generated during creation of the event forwarding discriminator by means for sending a request from the event forwarding discriminator to the proxy agent coordinator to obtain an identifier determined from the distinguished name of the event forwarding discriminator, means for returning the obtained identifier and means for storing the returned identifier in the event forwarding discriminator, the system comprising:

means for providing a proxy agent identifier in the notification generated by the proxy managed object, wherein the proxy agent identifier uniquely identifies a proxy agent containing the proxy managed object from which an event occurred;

means for comparing the proxy agent identifier in the notification to an identifier stored in the event forwarding discriminator, the stored identifier uniquely identifying the proxy agent containing the event forwarding discriminator; and means for processing the notification if the proxy agent identifier in the notification matches the identifier stored in the event forwarding discriminator.

\* \* \* \* \*